(12) United States Patent
Shimakawa

(10) Patent No.: US 6,313,867 B1
(45) Date of Patent: Nov. 6, 2001

(54) STEREOSCOPIC DISPLAY APPARATUS

(75) Inventor: Joji Shimakawa, Yokohama (JP)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/180,061

(22) PCT Filed: Mar. 23, 1998

(86) PCT No.: PCT/IB98/00425

§ 371 Date: Oct. 30, 1998

§ 102(e) Date: Oct. 30, 1998

(87) PCT Pub. No.: WO98/43126

PCT Pub. Date: Oct. 1, 1998

(30) Foreign Application Priority Data

Mar. 26, 1997 (JP) ................................................... 9-091629

(51) Int. Cl.⁷ .......................... H04N 13/04; H04N 15/00; H04N 9/47

(52) U.S. Cl. ................................................. 348/51; 348/53

(58) Field of Search .................................. 348/42, 51, 53; 359/458, 462, 466; 345/6; 349/15

(56) References Cited

U.S. PATENT DOCUMENTS

| | | | | |
|---|---|---|---|---|
| 5,311,220 | * | 5/1994 | Eichenlaub | 348/55 |
| 5,614,941 | * | 3/1997 | Hines | 348/42 |
| 6,034,717 | * | 3/2000 | Dentinger et al. | 348/51 |
| 6,069,649 | * | 5/2000 | Hattori | 348/51 |
| 6,163,336 | * | 12/2000 | Richards | 348/42 |

* cited by examiner

Primary Examiner—Vu Le

(57) ABSTRACT

An image projector (15) includes a plurality of display units (20-1, 20-2, 20-3) each having a pair of transmission-type display panels (21-L, 21-R) which are driven by video signals (VS-L, VS-R) for respective left and right eyes, and further having a pair of light sources (22-L, 22-R) for lighting the display panels. A convex lens (9) directs image containing light from the display units (15) to a concave mirror (12) serving as an imaginary screen in front of viewers (V1, V2).

4 Claims, 3 Drawing Sheets

STEREOSCOPIC DISPLAY APPARATUS

FIELD OF THE INVENTION

This invention generally relates to a stereoscopic display apparatus for displaying a stereoscopic image and more particularly to an improved stereoscopic display apparatus which can provide a stereoscopic image simultaneously to a plurality of viewers.

PRIOR ART

There has been proposed a stereoscopic display apparatus which can provide a stereoscopic image simultaneously to a plurality of viewers as described, for example, in U.S. Pat. No. 5,311,220. This conventional stereoscopic display apparatus comprises a plurality of light sources arranged on a plane and driven in a time-division manner, a single image forming device, for example, of the light transmission type which is common to a plurality of viewers, an optical system for guiding light beams from the plurality of light sources to the eyes of the viewers, respectively, and a control device for controlling light emitting positions of the light sources in accordance with the head positions of the viewers.

With the above conventional stereoscopic display apparatus, however, in order that a good stereoscopic image is viewed by every viewer, the eyes of all the viewers should substantially be on the same plane. As a result, the application of the conventional apparatus has been restricted to those for computer screens, video games and video rooms where the viewers sheets are arranged on a predetermined plane. Furthermore, since the conventional apparatus has such a structure that an image formed by a simple image forming device is illuminated by a plurality of light sources in a time-division fashion, it has been difficult to obtain a bright image and a light source of a special arrangement has been required.

It is therefore an object of the present invention to provide a stereoscopic display apparatus for a plurality of viewers, wherein positions at which the viewers get good stereoscopic images are not restricted to those situated on a plane.

It is another object of the present invention to provide a stereoscopic display apparatus for a plurality of viewers which does not require a specially arranged light source and can provide a brighter image than the conventional apparatus.

It is a further object of the present invention to provide a widely applicable stereoscopic display apparatus in which the freedom of the position of eyes where the viewers can get good stereoscopic images is sufficiently high, so that a plurality of viewers present at arbitrary positions in arbitrary attitudes without being bound by sheets or the like can be supplied with good stereoscopic images.

SUMMARY OF THE INVENTION

For achieving the above objects, a stereoscopic display apparatus is provided with a plurality of display units each having a pair of display panels which are driven in accordance with video signals for right and left eyes, respectively, which together represent a stereoscopic image; a concave mirror disposed before viewers for serving as an imaginary screen; convex lens means for directing image-containing lights from the plurality of display means to the concave mirror.

According to the stereoscopic display apparatus having the above structure, it is possible to provide a bright and good stereoscopic image to a plurality of viewers located at specified positions being not always in a plane by disposing the plurality of display units at specified positions in relation to the convex lens means.

Another stereoscopic display apparatus according to the present invention includes in addition to the above structure, drive means for separately moving the plurality of display units to desired three-dimensional coordinate positions with respect to the convex lens means. In this case, it is preferable to further provide an image taking device, such as a video camera, for shooting each viewer present in front of the concave mirror and a tracking control device for detecting a head position or both eye positions of the viewer based on an output from the image taking device and supplying a signal representing the detected output positions to the drive units thereby to move each of the display means to a three-dimensional coordinate position which corresponds to a position where each of the viewers is present.

According to the stereoscopic display apparatus having the above structure, it is possible to view always well a stereoscopic image even in case that each of viewers takes an arbitrary posture and moves to an arbitrary position.

EMBODIMENT OF THE INVENTION

Figure 1:
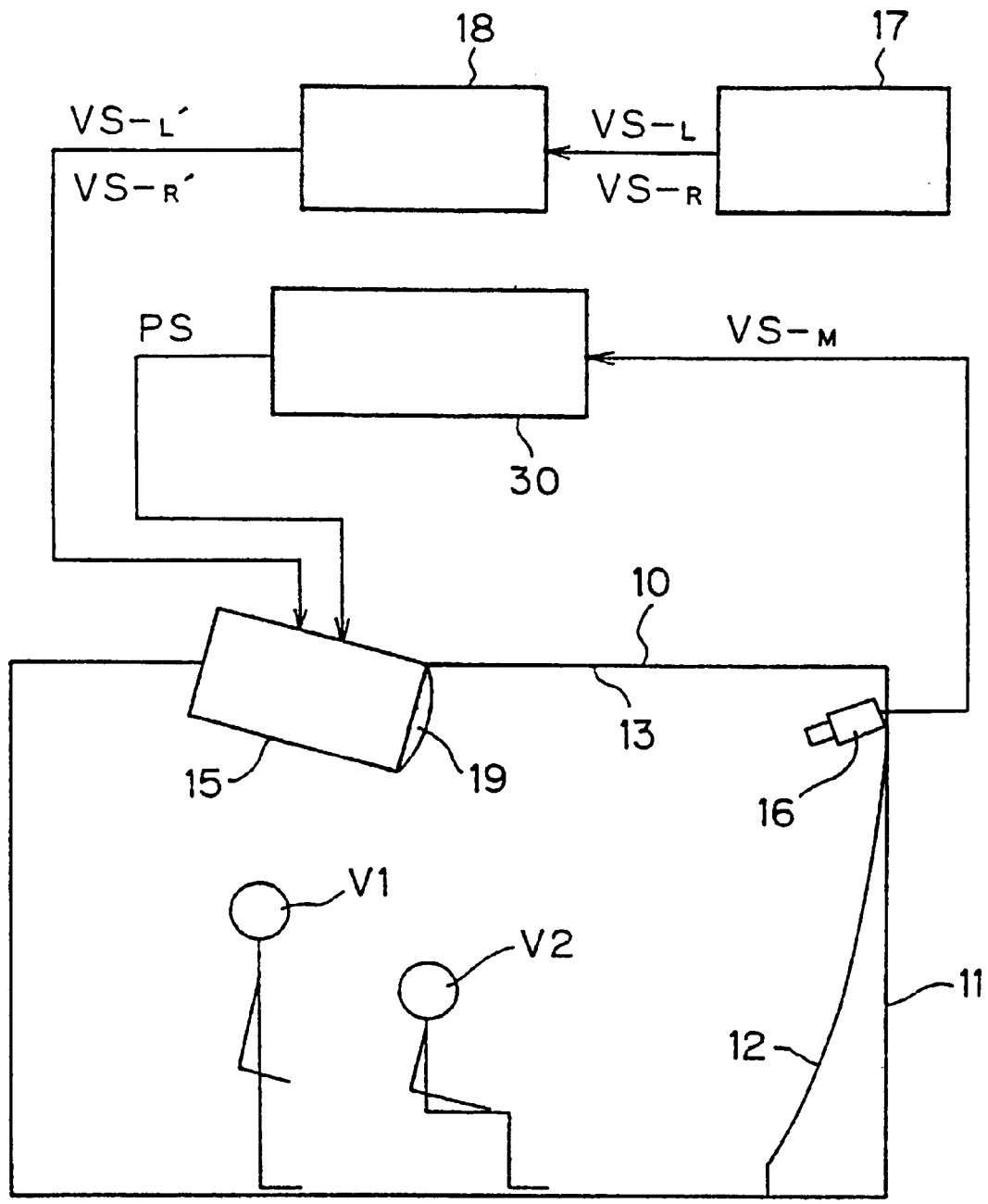
FIG. 1 is a conceptual diagram showing a stereoscopic audiovisual system to which an embodiment of a stereoscopic display apparatus according to the present invention is applied.

FIG. 1 shows conceptually a stereoscopic audiovisual system to which an embodiment of a stereoscopic display apparatus according to the invention is applied. This system has an audiovisual room 10 capable of accommodating a plurality of viewers V1, V2, and so on (only two viewers are shown in FIG. 1) in arbitrary postures at arbitrary positions. A concave mirror 12 acting as an imaginary screen is provided on the front wall 11 of this audiovisual room. A projector 15 described in detail later is installed at a specified position on the ceiling 13 of the audiovisual room. A video camera 16 for monitoring head (face) positions (more preferably both eye positions) of viewers V1, V2 and so on is installed above the front wall 11.

The stereoscopic audiovisual system further comprises a stereoscopic image source 17. This stereoscopic image source 17 has the known structure and comprises, for example, a pair of video cameras which take independently the respective images for left and right eyes and output video signals VS-L and VS-R corresponding to these images, or a playback machine or the like for reproducing the video signals VS-L and VS-R for both eyes from a recording medium (a magnetic tape, an optical disk, or the like) on which video signals obtained by such a pair of video cameras are recorded. These video signals VS-L and VS-R are supplied to a distribution circuit 18. The distribution circuit 18 is a circuit for distributing the video signals VS-L and VS-R to a specified number of display units described later, and in case of the simplest structure it is an amplification circuit for amplifying both of the video signals VS-L and VS-R. The amplified video signals VS-L' and VS-R' are supplied to the projector 15.

Figure 2:
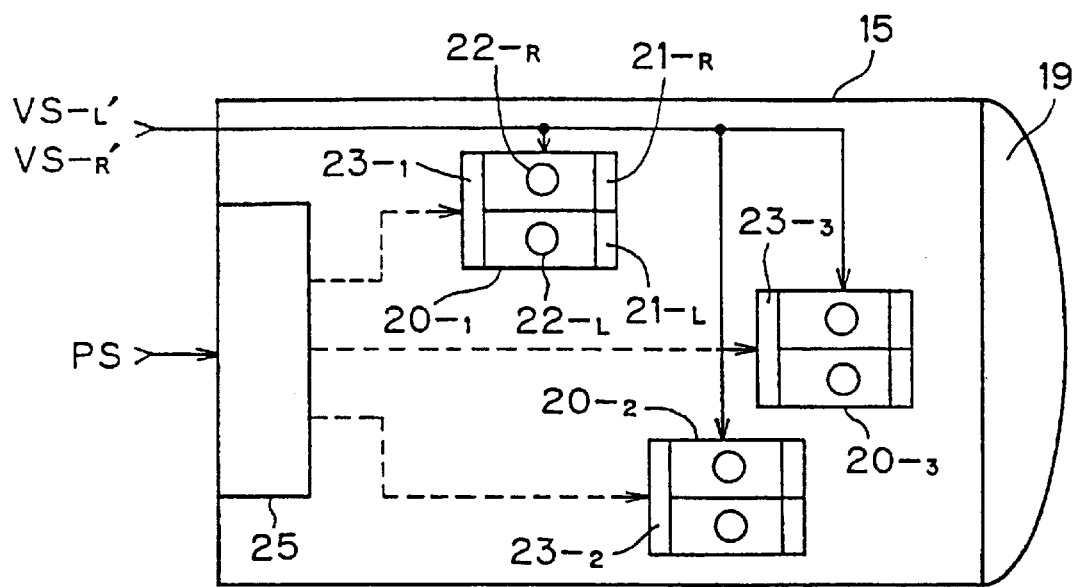
FIG. 2 is a conceptual diagram showing a rough composition of a projector in the embodiment with its plan view.
Figure 3:
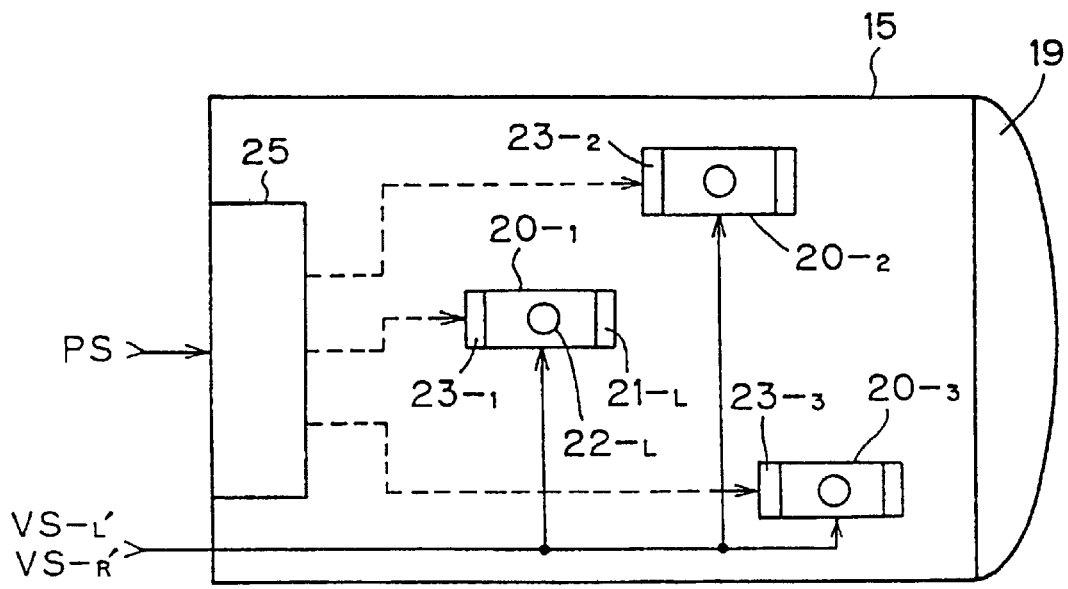
FIG. 3 is a conceptual diagram showing a rough composition of a projector in the embodiment with its side view.

FIGS. 2 and 3 are conceptual diagrams showing an exemplary structure of the projector 15. As shown in these figures, the projector 15 is provided with a convex lens 19 at the front face opposite to the concave mirror 12 and with a plurality of display units 20-1, 20-2, 20-3 and so on (only three units are shown in this figure) of the same structure, wherein the video signals VS-L' and VS-R' are supplied in common to these display units. The display unit 20-1 has a pair of left and right transmission-typed liquid crystal colour display panels 21-L and 21-R at its front face opposite to the lens 19, and has projection light sources 22-L and 22-R such as halogen electric bulbs at the back of these display panels. In this case, the display panel 21-L is a display panel for a left eye and is driven by the video signal VS-L', while the other hand the display panel 21-R is a display panel for a right eye and is driven by the video signal VS-R'. These transmission-typed liquid crystal colour display panels 21-L and 21-R both are of the conventional type. The other projection units 20-2, 20-3 and so on have also the same structure as the projection unit 20-1.

In the projector 15, the display units 20-1, 20-2, 20-3 and so on can be moved independently of one another along the three coordinate axes of X, Y and Z, and have respectively drive mechanisms 23-1, 23-2, 23-3 and so on for this purpose. These display units 20-1, 20-2, 20-3 and so on are separately driven through the drive mechanisms 23-1, 23-2, 23-3 and so on by a drive control unit 25 provided on the projector 15, whereby these display units can be moved to arbitrary three-dimensional coordinate positions within the projector 15. In case that positions of the viewers V1, V2 and so on in the audiovisual room 10 are determined in advance according to seats and the like, since the display units 20-1, 20-2, 20-3 and so on may be fixedly arranged at specified three-dimensional coordinate positions in the projector 15 corresponding to positions of the seats, the drive mechanisms 23-1, 23-2, 23-3 and so on as well as the drive control unit 25 will not be necessary.

Referring to FIG. 1 again, a monitoring video signal VS-M outputted from the video camera 16 provided on the audiovisual room 10 is supplied to a tracking information processing device 30. This tracking information processing device 30 is constructed to always detect positions of the faces or both eyes of the viewers V1, V2 and so on in the audiovisual room on the basis of spatial image information within the audiovisual room 10 represented by the video signal VS-M, and to output a position signal PS representing the detected positions. Although such a tracking information processing device can be constructed using, for example, a neural network or the like, alternatively it can be constructed on the basis of such technique as disclosed in an article "Head Tracking Stereoscopic Display Apparatus" contributed by Alfred Schwartz to the transaction of International Display Conference in 1985 or in U.S. Pat. No. 4,649,425. The position signal PS generated by this tracking information processing device 30, is supplied to the drive control unit 25 of the projector 15 shown in FIGS. 2 and 3.

Next, the operation of the stereoscopic audiovisual system having the above structure will be described with reference to FIG. 4. In order to make the description simple, FIG. 4 shows the reflecting face of the concave mirror 12 as a virtual optical element having a convex lens function, and shows viewers (only head parts of two viewers V1 and V2 are shown in the figure) as if they are not in the audiovisual room 10 but are at the opposite side of the concave mirror 12, and further shows only two display units (20-1 and 20-2) in the projector 15.

Figure 4:
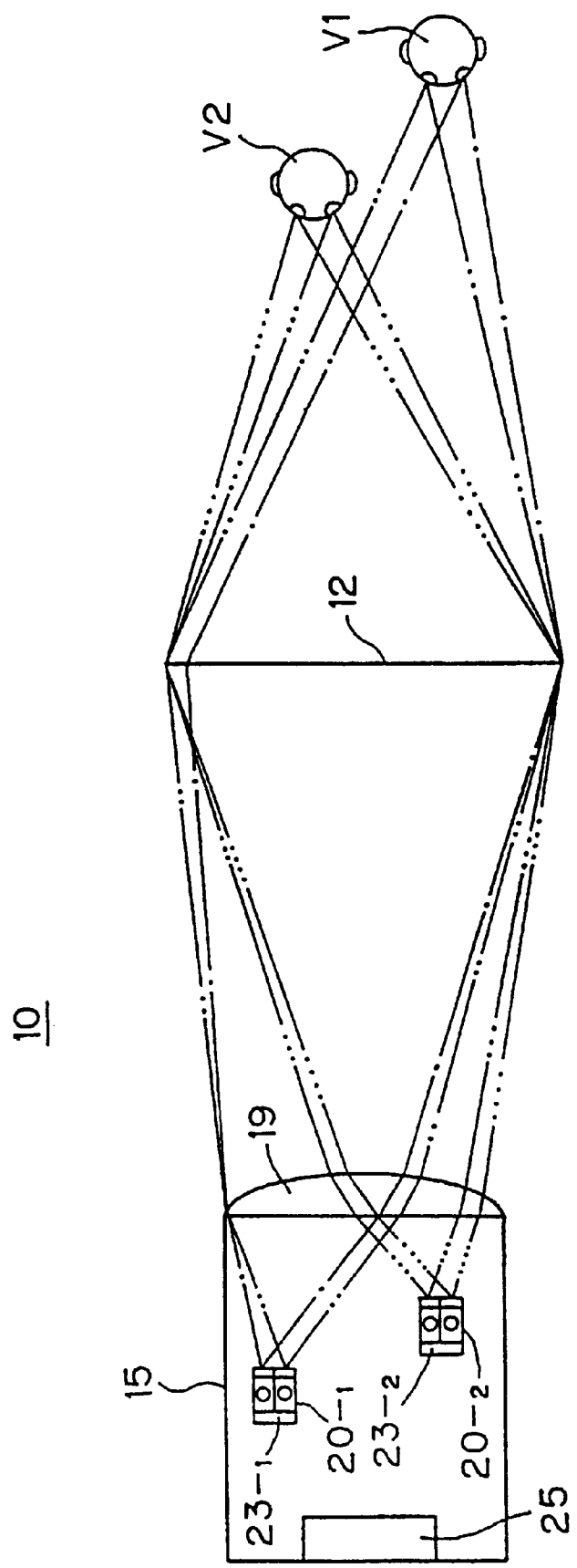
FIG. 4 is a conceptual diagram for explaining a state of projection of a stereoscopic image for viewers by means of the embodiment.

In FIG. 4, the display units 20-1, 20-2 and so on of the projector 15 are commonly driven by the video signals VS-L' and VS-R', and each of the units emits image lights for forming the same stereoscopic image. In this case, the display unit 20-1 is driven through the drive control unit 25 by the drive mechanism 23-1 on the basis of three-dimensional position information of both eyes of the viewer V1 contained in the position signal PS from the tracking information processing device 30 (FIG. 1), and is positioned at a three-dimensional coordinate position where images to be formed by the left and right image lights (respectively shown by one-dot chain lines and two-dot chain lines) of the unit 20-1 are formed on the left and right eyes of the viewer V1 through the lens 19 and the concave mirror 12. Similarly, the display unit 20-2 is also driven through the drive control unit 25 by the drive mechanism 23-2 on the basis of three-dimensional position information of both eyes of the viewer V2 contained in the position signal PS, and is positioned at a three-dimensional coordinate position where images to be formed by the left and right image lights (respectively shown by three-dot chain lines and four-dot chain lines) of the unit 20-2 are formed on the left and right eyes of the viewer V2 through the lens 19 and the concave mirror 12. In the same way as described above, the other display units are also positioned respectively at three-dimensional coordinate positions where stereoscopic images are formed on both eyes of the corresponding viewers, on the basis of the position signal PS.

Since the three-dimensional coordinate position of each of the display units 20 is always position-controlled (namely, tracking controlled) to the optimum position by the position information signal PS generated by the tracking information processing device 30 or the basis of the output signal VS-M of the video camera 16, each viewer can always view a stereoscopic image in the optimum state even when he changes his posture and/or moves within the audiovisual room.

Although in the above-mentioned embodiment the projector 15 uses one convex lens 19 in its optical system, it may use a fresnel lens or the like having a similar optical function instead of the convex lens 19.

Also, although in the projector 15 the display units 20-1, 20-2 and so on use transmission-type liquid crystal display panels 21-R and 21-L, they may use any emission-type display devices having a similar display function. The light sources for both eyes for each display unit may be constructed not only by two separate light sources 22-R and 22-L but also by a single light source which is divided into two virtual light sources by means of an optical system.

The distribution circuit 18 for distributing the video signals VS-L and VS-R to the display units 20-1, 20-2 and so on may not only be means for supplying the amplified video signals VS-L' and VS-R' respectively in common to the display units but also, for example, be means for distributing the video signals VS-L and VS-R to the display units in a time-division manner.

Although in the above-described embodiment the stereoscopic display apparatus is constructed so as to form an output image of each display unit 20 on both eyes of a corresponding viewer by controlling the three dimensional coordinate position of each display unit 20 within the projector 15, instead of this the stereoscopic display apparatus may be constructed so as to arrange the display units 20-1, 20-2 and so on substantially in parallel with the reflecting face of the concave mirror 12 and provide on each of the display units separately a convex lens variable in distance from the corresponding display unit according to a position of each viewer. In this case, it is preferable that the display units are arranged so as to be movable independently and two-dimensionally in the plane in which they are arranged.

What is claimed is:

1. A stereoscopic display apparatus comprising:

a plurality of display means each having a pair of display panels which are driven in accordance with video signals for right and left eyes, respectively, which together represent a stereoscopic image;

a concave mirror disposed before viewers for serving as an imaginary screen;

convex lens means for directing image-containing lights from said plurality of display means to said concave mirror.

2. A stereoscopic display apparatus according to claim 1, further comprising drive means for separately moving each of said plurality of display means to a desired respective three-dimensional position with respect to said convex lens means.

3. A stereoscopic display apparatus according to claim 2, further comprising camera means for shooting viewers present in front of said concave mirror and tracking control means for detecting a position or positions of a head or two eyes of each viewer based on an output from said camera means and for supplying a signal representing the detected positions to said drive means thereby to move each of said display means to a respective one of three-dimensional positions which correspond respectively to positions where the viewers are present.

4. A stereoscopic display apparatus according to claim 1, wherein each pair of display panels comprises a pair of transmission-type display plates driven respectively by the video signals for right and left eyes and a light source for supplying light beams to these display plates.

* * * * *